No. 675,111. Patented May 28, 1901.
A. F. ROBERTS.
MACHINE FOR SEALING AND STAMPING ENVELOPS.
(Application filed July 24, 1899.)
(No Model.) 7 Sheets—Sheet 3.
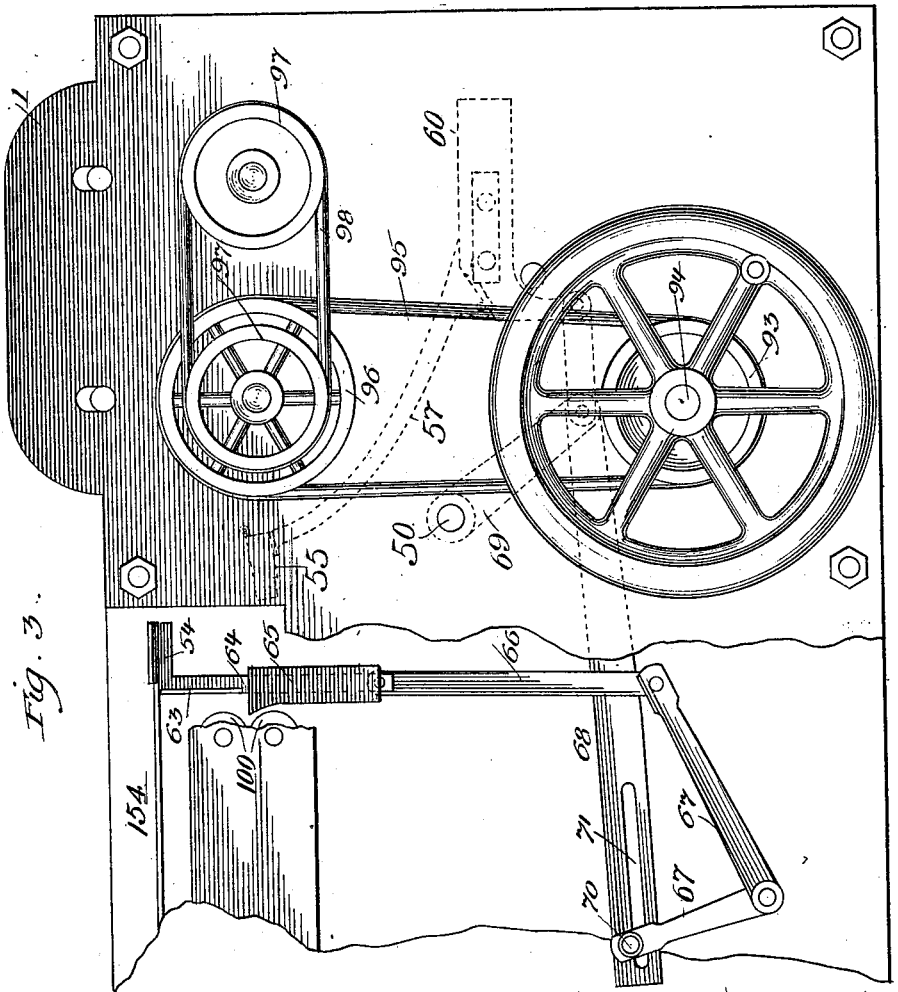
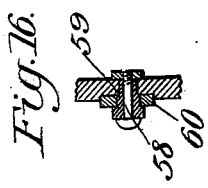
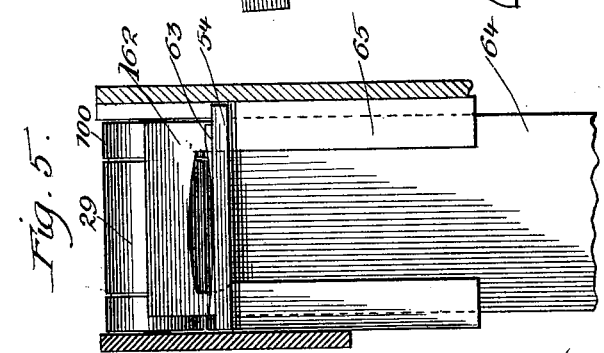
Witnesses:
Frank S. Blanchard
N. W. Munday
Inventor:
Albert F. Roberts.
By Attorneys
Munday, Evarts & Adcock.

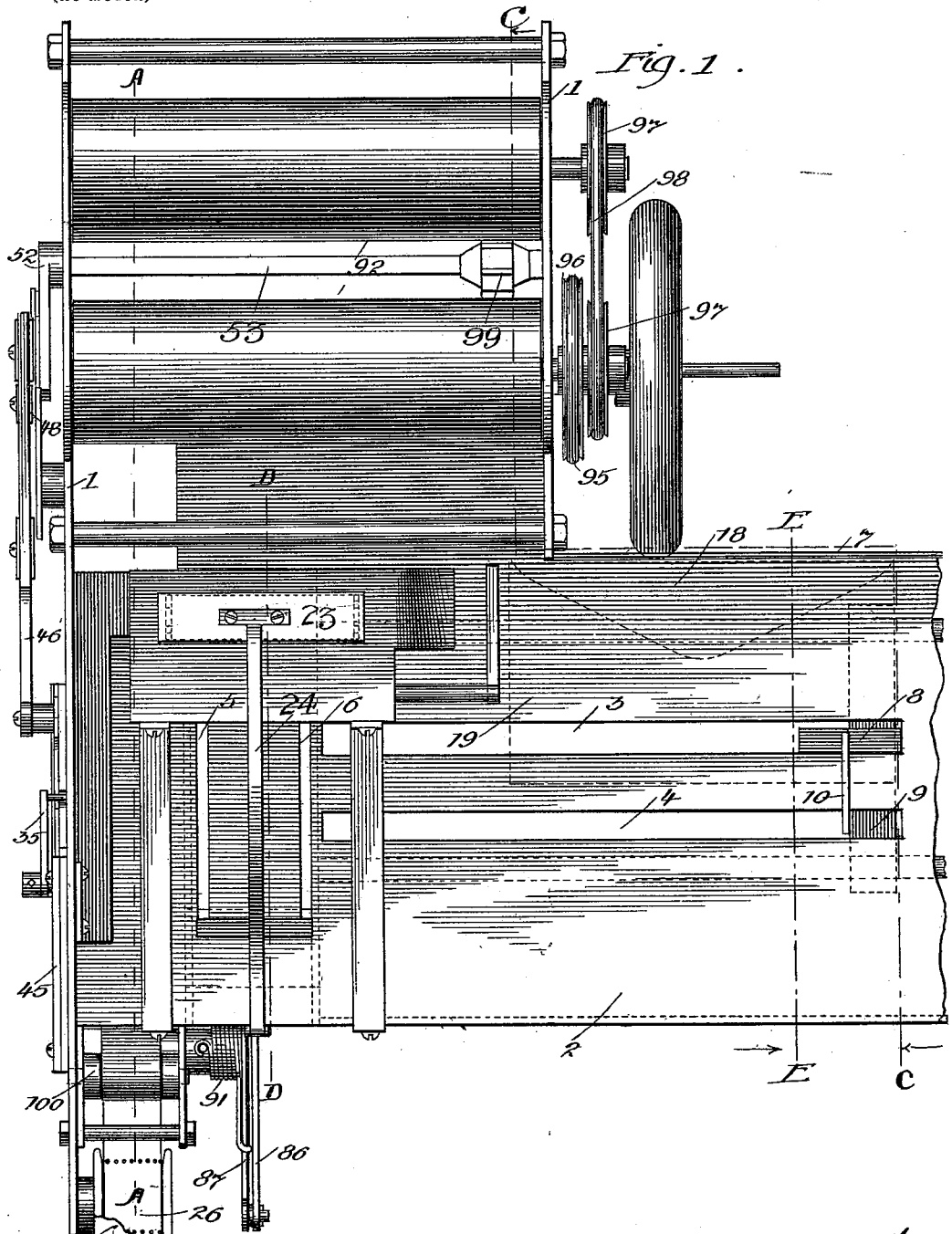

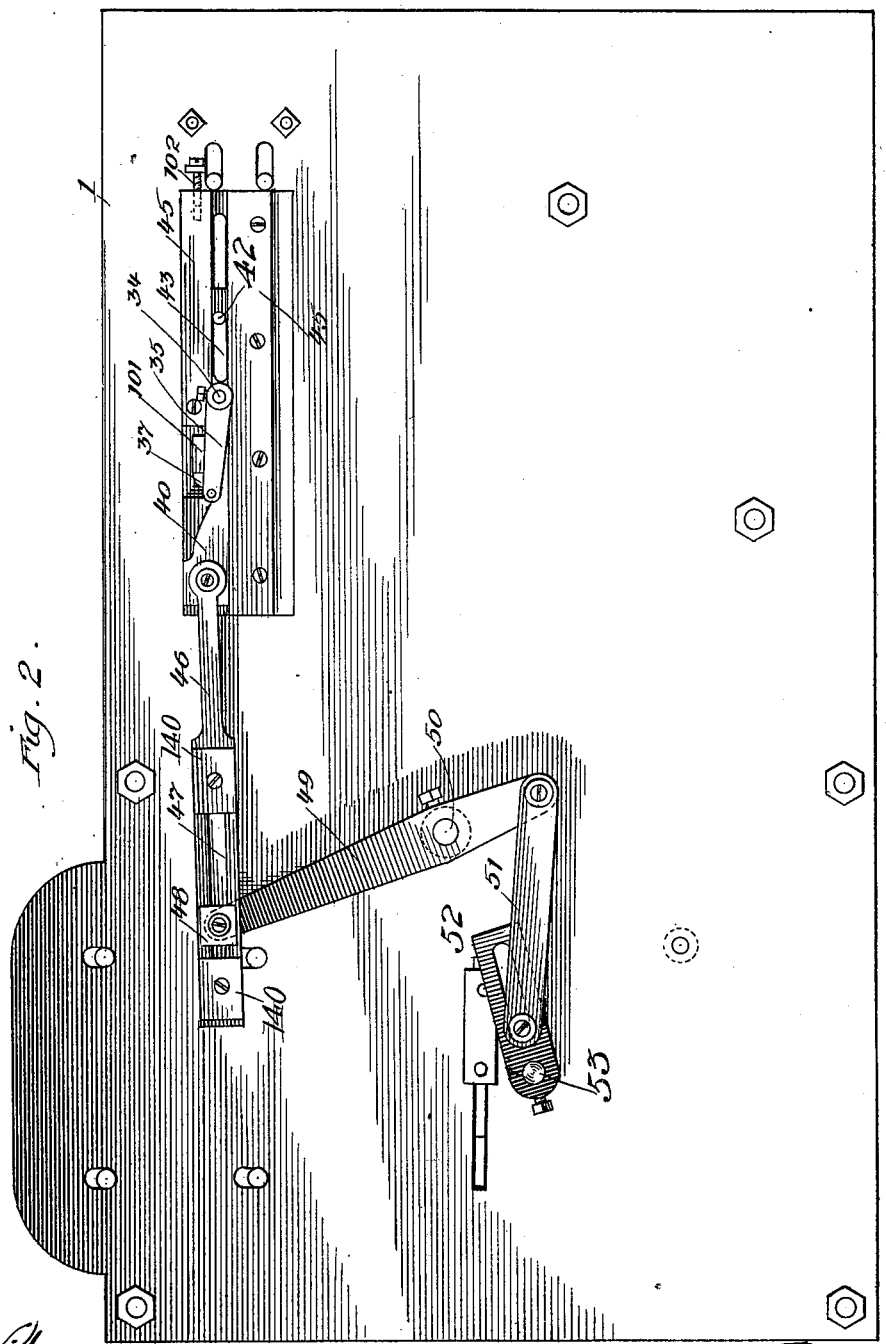

No. 675,111. Patented May 28, 1901.
A. F. ROBERTS.
MACHINE FOR SEALING AND STAMPING ENVELOPS.
(Application filed July 24, 1899.)
(No Model.) 7 Sheets—Sheet 4.
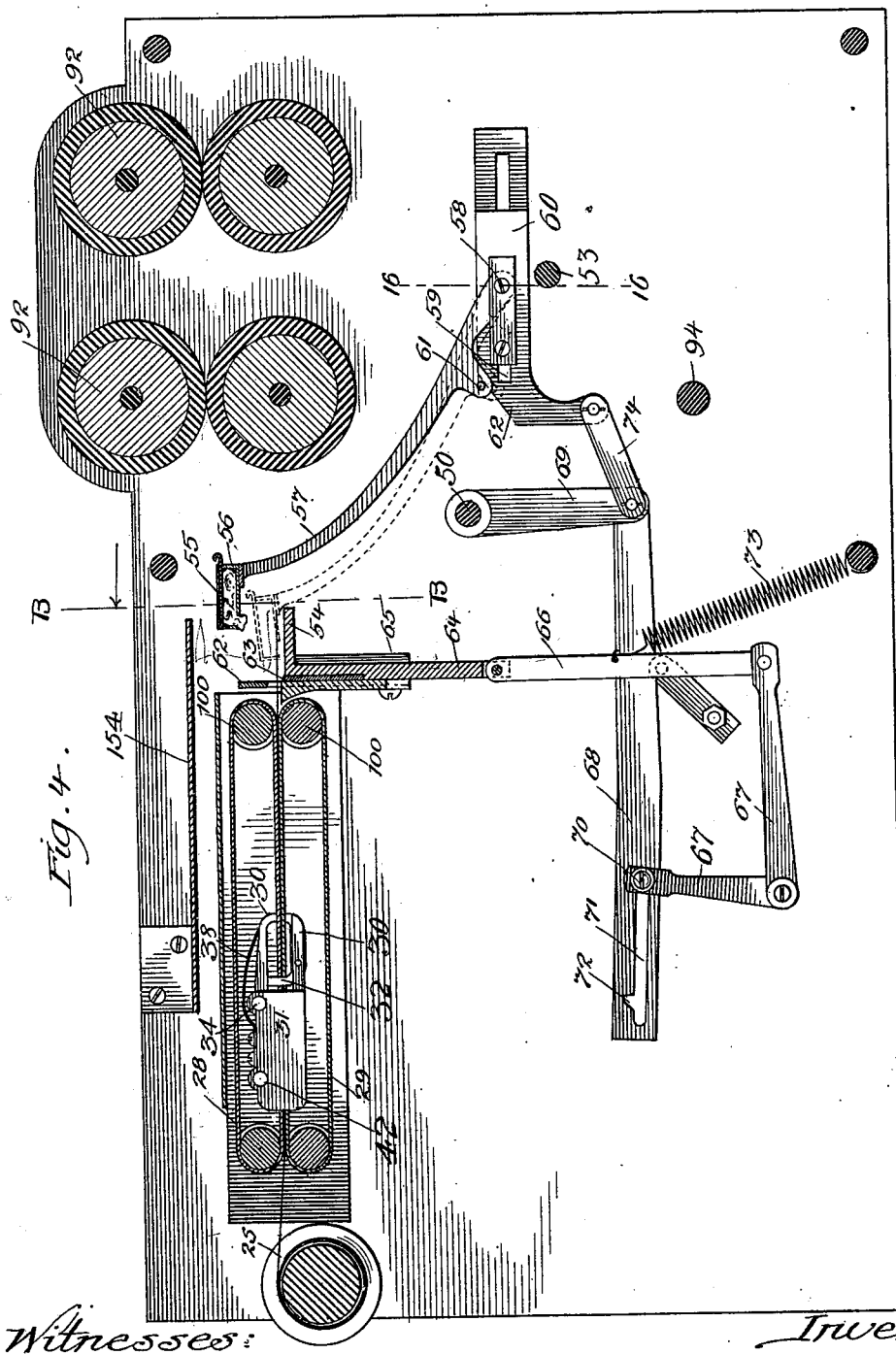
Witnesses:
Frank S. Blanchard
Inventor:
Albert F. Roberts
By Attorneys
Munday, Evarts & Adcock

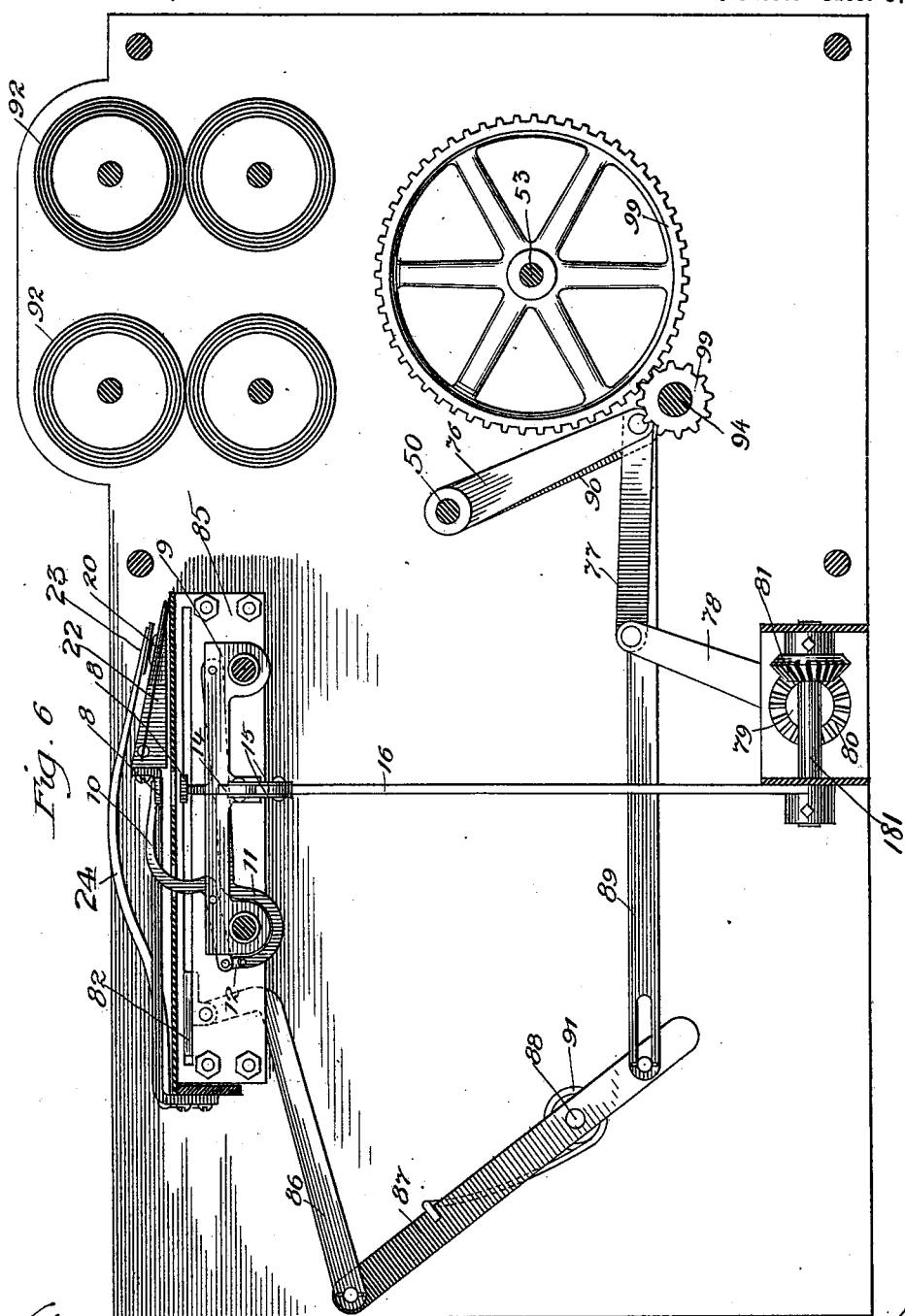

No. 675,111. Patented May 28, 1901.
A. F. ROBERTS.
MACHINE FOR SEALING AND STAMPING ENVELOPS.
(Application filed July 24, 1899.)
(No Model.) 7 Sheets—Sheet 6.
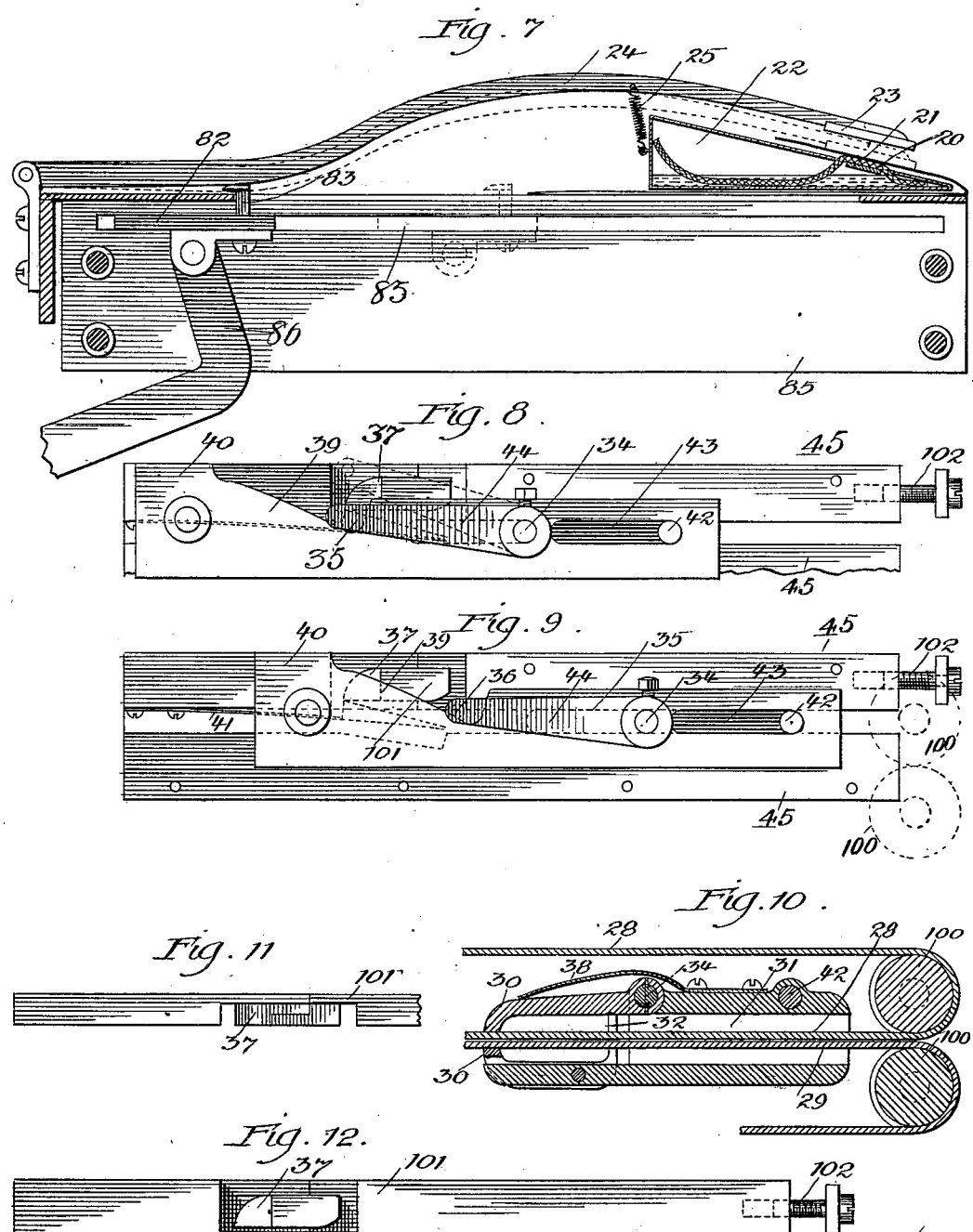

No. 675,111. Patented May 28, 1901.
A. F. ROBERTS.
MACHINE FOR SEALING AND STAMPING ENVELOPS.
(Application filed July 24, 1899.)
(No Model.) 7 Sheets—Sheet 7.
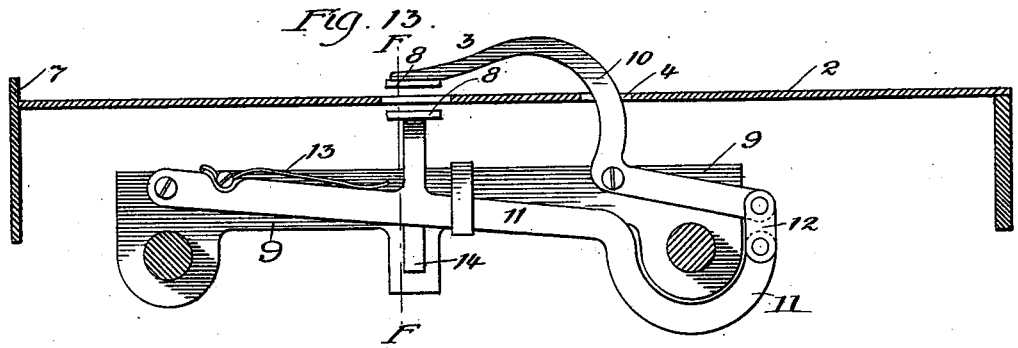
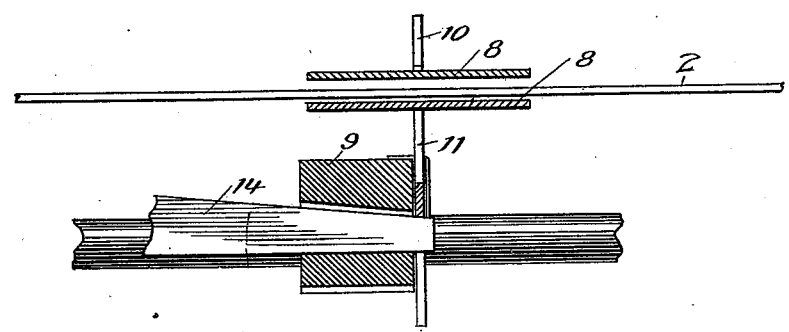
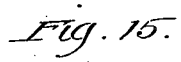
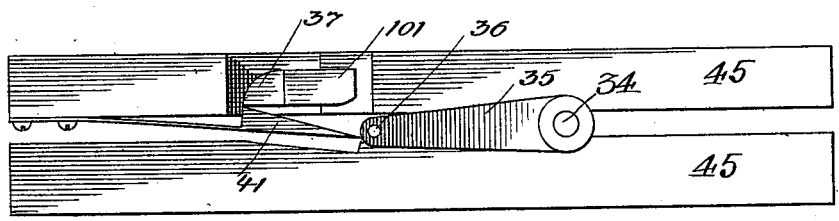
Witnesses:
Frank S. Blanchard
Inventor:
Albert F. Roberts.
By Munday, Evarts & Adcock
Attorneys.
THE NORRIS PETERS CO., PHOTO-LITHO., WASHINGTON, D. C.

UNITED STATES PATENT OFFICE.

ALBERT F. ROBERTS, OF CHICAGO, ILLINOIS.

MACHINE FOR SEALING AND STAMPING ENVELOPS.

SPECIFICATION forming part of Letters Patent No. 675,111, dated May 28, 1901.

Application filed July 24, 1899. Serial No. 724,897. (No model.)

*To all whom it may concern:*

Be it known that I, ALBERT F. ROBERTS, a citizen of the United States, residing in Chicago, in the county of Cook and State of Illinois, have invented a new and useful Improvement in Machines for Sealing and Stamping Envelops, of which the following is a specification.

My invention relates to machines for sealing and stamping envelops.

The object of my invention is to provide a machine of a simple, efficient, and durable construction by means of which envelops may be automatically and rapidly and cheaply sealed and stamped.

My invention consists in the means I employ to accomplish this object or result; and it comprises, in coöperative combination, a feed-table for the envelops, a longitudinal feeder or device for feeding or moving the envelops longitudinally or in the direction of their length along the feed-table, a flap-raising device for raising the flap of the envelop, a moistening pad or device for moistening the mucilage on the envelop-flap as the envelop is moved along the feed-table by the feeder, a presser-plate to hold the flap against the moistening device, a device for feeding the ribbon of stamps from a spool or reel intermittently as required, a pad or device for moistening the stamp, a stationary and a movable knife for cutting the stamps one by one from the stamp-ribbon, a presser-plate for pressing the severed and moistened stamp against the envelop, a spring plate or device for holding the envelop in position against the pressure of the stamp-presser plate, a transverse feeder or device for feeding or moving the envelop transversely off the feeder-plate into the bite of the sealing-rolls, and sealing-rolls, preferably two pair, for securely pressing the moistened flap against the envelop and sealing it thereto and discharging the sealed and stamped envelop from the machine. These principal parts or devices are combined with suitable connecting and operating mechanism for giving the required movements thereto in proper time.

My invention also consists in the novel construction of parts and devices and in the novel combinations of parts and devices herein shown and described and more particularly specified in the claims.

In the accompanying drawings, forming a part of this specification, and in which similar figures of reference indicate like parts throughout the drawings, Figure 1 is a plan view of a machine embodying my invention. Fig. 2 is a side elevation. Fig. 3 is a partial side elevation looking from the opposite side of Fig. 2. Fig. 4 is a vertical transverse section on the line A A of Fig. 1. Fig. 5 is a detail vertical section on the line B B of Fig. 4. Fig. 6 is a vertical section on line C C of Fig. 1. Fig. 7 is a detail vertical section on line D D of Fig. 1. Figs. 8 and 9 are detail elevations of parts hereinafter to be described. Fig. 10 is a vertical longitudinal section of the stamp-feed device. Figs. 11 and 12 are detail views showing the cam for controlling the stamp-feed device. Fig. 13 is a vertical section on line E E of Fig. 1. Fig. 14 is a section on line F F of Fig. 13, and Fig. 15 is a detail view showing the cam controlling the stamp-feed device and having the guide-plates removed. Fig. 16 is a detail section on line 16 16 of Fig. 4.

In said drawings, 1 represents the frame of the machine, 2 the feed-table, and upon which the envelops are laid flat side up. The feed-table 2 is furnished with two longitudinal slots 3 and 4, one for the envelop-feeder to fit and reciprocate in and the other for its operating arm or lever to project through. It also has two transverse slots 5 6 for the transverse feeder to project through and reciprocate in. The feed-table is further provided with a guide 7 for the edge of the envelop to fit against.

The longitudinal envelop-feeder 8 is the device by which the envelops are pushed or fed in the direction of their length along the feed-table. It may be of any suitable construction. As illustrated in the drawings it comprises a pair of clamping-jaws 8 8, mounted on a reciprocating slide 9 and adapted to be opened and closed by a pair of pivoted levers 10 11, which are pivoted together at 12. The clamping-jaws are automatically opened by a spring 13, attached to the slide 9 and engaging one of the clamping-jaw levers. The clamping-jaws of the feeder are automatically closed to grip the envelop, which is placed between them by means of a wedge-shaped cam-acting slide 14, which reciprocates in a suitable guideway in the slide 9 and is connected by a pivoted link 15 with the operating arm or lever 16, by which the feeder-slide 9 is reciprocated back and forth. The first movement or effect of the operating-arm 16 to make the forward stroke of the feed-slide 9 is thus to cause the wedge or cam 14 to close the feeder-clamps 8 8 together and grasp the envelop, and thus carry the envelop forward with the feed-slide.

The flap-raiser or flap-raising device preferably is made of a thin flat spring-blade, arranged at an angle to the plane of the feed-table and projecting in the path of the flap 18 of the envelop 19 as it is fed longitudinally forward by the feeder 8 8, so that the flap will thus be raised or turned up, and thus cause the flap to pass above the moistening pad or device 20. The moistening-pad 20 is preferably made of absorbent material or lamp-wicking and is supported in position to engage the under side of the flap and moisten the mucilage thereon by a plate 21 on the water-pan 22, from which the wick or moistening-pad is supplied with moisture. The pan 22 and plate 21 are fixed to the stationary frame of the machine above the feed-table.

23 is the presser-plate by which the flap is held or pressed against the moistening-pad as the envelop is carried forward transversely by the transverse envelop-feeder. The presser-plate 23 is mounted on a movable arm 24, which is raised to permit the envelop-flap to pass under the presser-plate as the envelop is fed forward longitudinally by the longitudinal feeder 8. The presser-plate arm 24 is then caused to descend and press the flap against the moistening-pad by a spring 25.

The postage-stamps 26 are automatically fed forward one by one between a pair of endless flexible feed-belts 28 and 29, preferably of leather, by a reciprocating stamp-feeder 30 30, which grasps the stamp between the two adjacent loops of the belt. The stamp-feeder 30 30 consists, preferably, of a pair of pivoted jaws or levers mounted on a reciprocating slide or carriage 31, between which the adjacent loops or members of the feed-belts pass. The lower clamp-jaw 30 has a bent arm 32, which engages the upper clamp-jaw 30, so that when the upper clamp-jaw is closed by the spring 38 the lower clamp-jaw will be simultaneously closed. The pivot or shaft 34 of the upper clamp-jaw is provided with a crank-arm 35, having a pin 36, which passes around an endless guide or cam 37 on the frame of the machine to hold the clamp-jaws closed when they make their forward reciprocation and to hold the same apart when they make their backward movement. This guide or cam 37 is made of adjustable length, so that it may be adjusted to correspond to the length of a single stamp, and thus enable the machine to have the necessary absolutely correct forward feed of the stamp-ribbon. This accuracy of feed is necessary, because otherwise a part of two different stamps might be applied to the envelop. The length of this guide or cam 37 is made adjustable by making it in two pieces or parts. The movable or adjustable part 101 thereof may be moved or adjusted in respect to the other part 37 thereof by means of the adjusting-screw 102. This will be readily understood from Figs. 8, 9, 11, and 12 of the drawings. A spring 38 holds the clamp-jaws closed and causes the pin 36 on the crank-arm 35 to drop from the upper to the lower member of the endless guide or cam 37, at the rear end thereof, and a wedge or cam 39 on the reciprocating slide 40 by engaging said pin 36 serves to lift the pin from the lower member to the upper member of the guide-slot, at the forward end thereof. A spring 41, engaging the pin 36, prevents any danger of the pin being pushed back in the lower member of the slot instead of being raised to the upper member of said guide-slot on the backward reciprocation of the stamp-feeder. The reciprocating slide or carriage 31 of the stamp-feeder 30 is connected with the reciprocating slide 40 by a pin 42 on said slide or carriage, which fits in a slot 43 in the slide 40, and by said pivot or shaft 34, which fits in a slot 44 in said slide 40. These slots 43 and 44 permit the slide 40 to make the necessary movement to cause the wedge 39 to lift the pin from the lower to the upper member of the guide-slot before beginning to move the stamp-feeder carriage. These slots also give the necessary slack for the return movement. 45 45 are the guides in which the slide 40 reciprocates. The slide 40 is reciprocated back and forth, as required, by a link 46, pivoted to said slide and furnished with a slot 47, in which fits a sliding head 48, carried by a lever 49, pivoted at 50 to the frame and connected by a link 51 to the crank-arm 52 on the shaft 53. The slot 47 in the link 46 gives the necessary time or lost motion to enable the stamp-presser plate 54 to get out of the way before the stamps are carried forward by the stamp-feeder. In order to give the slide 31 the proper forward-and-backward movement to correspond to the length of the cam 37 as the same may be changed by adjustment, I provide the link 46 with adjustable stops 140, so that the movement of the slide 40 (through which the slide 31 is moved) may be correspondingly varied.

The stamp-moistening pad or device 55 consists, preferably, of a piece of sponge secured to the holder 56, carried by an operating arm or lever 57, having a slotted and pivotal connection by a pin 58 and slot 59 with a reciprocating slide 60. The lever 57 is furnished with a pin 61, that engages a cam 62 on said slide 60, so that the pad-holder on said operating arm or lever will be given an up-and-down movement and also a backward-and-forward or reciprocating movement to bring the pad over and down upon the stamp and then draw it horizontally over the surface of the stamp to properly moisten the same. Said pin 61 on the lever 57 by engaging the cam 62 on the slide 60 moves said arm or lever up and down, the slot 59 in said slide 60 giving the necessary play or lost motion to enable this up-and-down movement to take place before said slide 60 carries the lever 57 and moistening-pad 55 backward. The stamp-moistening pad 55 is by this means first raised above the level of the stamp on the stamp-support 54, then moved horizontally over the stamp, then moved downward upon the stamp, and then wiped or drawn horizontally over the surface of the stamp.

While the stamp is being operated upon by the moistening-pad it is supported on the stamp-presser plate 54, before mentioned.

162 is a stationary cutter or knife which operates in conjunction with the movable knife or cutter 63 to sever the stamp (which has been fed forward over the presser-plate 54 by the stamp-feeder) from the stamp-ribbon after said stamp has been moistened. The movable knife 63 is secured to the rear edge of the stamp-presser plate and is operated thereby. The upper edge of the movable knife 63 does not project above the surface of the presser-plate 54 sufficiently to cut the envelop when said plate presses the stamp against it.

The stamp-presser plate 54 has an up-and-down movement to press the stamp against the under side of the envelop at the corner thereof, said plate being carried by a reciprocating slide or plunger 64, moving up and down in a suitable guide 65. It is connected by a pivoted link 66 to a lever 67, pivoted to the frame of the machine, which is operated by a slotted reciprocating link 68, pivoted to a crank-arm 69 on the rock-shaft 50. The lever 67 has a pin 70, which fits in the slot 71 in said link 68, said link being also furnished with a notch 72 to engage said pin and cause the stamp-presser plate to be lifted at the proper time, and then permit it to be quickly retracted by the spring 73, connected to its operating-link. The envelop is held in position against the pressure of the stamp-presser plate 54 by a spring-plate 154, secured to the frame above the feed-table 2.

The slide 60, which operates the stamp-moistening-pad arm, is connected by a link 74 with the crank-arm 69, and is thus operated from the same rock-shaft 50 as the stamp-presser plate.

Motion is communicated to the vibrating arm or lever 16, by which the slide or carriage 9 of the longitudinal envelop-feeder is operated from the rock-shaft 50, by an arm 76, which is connected by a link 77 with an arm 78 on a shaft 79, carrying a bevel-gear 80, which meshes with a bevel-gear 81 on the shaft 181, to which said arm or lever 16 is secured.

The transverse envelop-feeder consists, preferably, of a pusher-bar 82, having pins 83 passing through the transverse slots 5 6 in the feed-table and connected with the reciprocating slide 82, that works back and forth in suitable guides 85 on the frame and serves to push the envelop transversely forward off the feed-table and into the bite of the sealing-rolls. The slide or carriage 82 of the transverse envelop-feeder is connected by a pivoted link 86 to the lever 87, pivoted to the frame at 88, and connected by a slotted link 89 with an arm 90 on the rock-shaft 50. The slot in the link 89 gives the necessary lost motion to cause the transverse feeder to move forward at the proper time. A spring 91 retracts said transverse feeder. As the envelop is fed transversely forward by the transverse feeder the mucilaged surface of the flap is drawn over and pressed against the flap-moistening pad or device and properly moistened.

92 92 are sealing-rollers, preferably of rubber and preferably two pair in number. They serve to securely press both the stamp and moistened flap against the envelop and seal the same. Motion is communicated to the lower sealing-roller of the first pair by a pulley 93 on the driving-shaft 94 and a belt 95, which passes over a pulley 96 on the shaft of said roller. Pulleys 97 97 and belt 98 communicate motion to the lower roller of the second pair. Motion is communicated from the driving-shaft 94 to the crank-shaft 53, which operates the actuating-lever 49 of the stamp-feed slide by the intermeshing gears 99 99.

100 100 are guide-rollers over which the stamp-feed belts pass.

The arm 24 of the presser-plate 23 is held normally up by the transverse feeder 82 and is caused to be depressed by its spring 25 against the envelop at the proper time by the forward movement of said transverse feeder.

As the longitudinal envelop-feeder consists of a pair of reciprocating clamping-jaws, which close upon and grasp the envelop placed between them, and as this feeder reciprocates a certain definite distance, it serves to bring the forward end of the envelop into the exact position required to receive the stamp at its upper right-hand corner, whatever may be the length of the envelop. If the envelop is a long one, the clamping-jaws will grasp it near its middle in respect to length; if a very short one, the clamping-jaws will grasp it near its rear end. The longitudinal feeder thus serves to feed the envelop in the direction of its length the required distance to bring its upper right-hand corner into proper registry with the stamp-presser plate, whatever may be the length of the envelop.

I claim—

1. In a machine for sealing and applying postage-stamps to envelops, the combination with a feed-table, of a longitudinally-reciprocating feeder for moving the envelops on the feed-table in the direction of their length, a flap-raising device, a moistening-pad, a presser-plate on the frame to hold the flap against the moistening-pad, a stamp-ribbon feeder, a pad or device for moistening the stamp, a vertically-reciprocating presser-plate for supporting the stamp as it is being moistened and pressing it against the envelop, a pair of knives or cutters for severing the stamp from the stamp-ribbon, a plate or device for holding the envelop in position against the pressure of the stamp-presser plate, a transversely-reciprocating feeder, and sealing-rolls, substantially as specified.

2. In an envelop sealing and stamping machine, the combination with the feed-table provided with a longitudinal slot, of a reciprocating envelop-feeder comprising a pair of opening and closing clamping-jaws working in said slot, and levers and connections for opening and closing the clamping-jaws and reciprocating the same along the feed-table, one of said clamping-jaws being carried above the feed-table and engaging the upper side of the envelop, and the other being carried below the feed-table and clamping the envelop from below, substantially as specified.

3. The combination with a slotted feed-table, of a reciprocating envelop-feeder comprising a pair of opening and closing clamping-jaws working in the slot of the feed-table, a flap-raising device and a flap-moistening device, one of said clamping-jaws being carried above the feed-table and engaging the upper side of the envelop, and the other being carried below the feed-table and clamping the envelop from below, substantially as specified.

4. The combination with a slotted feed-table, of a reciprocating envelop-feeder comprising a pair of opening and closing clamping-jaws working in the slot of the feed-table, a flap-raising device, a flap-moistening device and a movable presser-plate to hold the flap against the moistening device, and means for operating said movable presser-plate, substantially as specified.

5. The combination with a feed-table, of a stamp-ribbon-feed device, comprising a pair of opening and closing jaws and a pair of flexible belts between the jaws and between which the stamp-ribbon passes, substantially as specified.

6. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, substantially as specified.

7. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, said cam or guide being in two parts, one adjustable in respect to the other to enable the extent of feed to be accurately adjusted, substantially as specified.

8. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, a stationary endless guide or cam engaging said pin or projection to control the opening and closing of the clamping-jaws and the extent of feed, and a reciprocating slide having a wedge or cam engaging said pin or projection on the crank-arm to lift said pin and crank-arm from the lower to the upper part of said guide or cam, substantially as specified.

9. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed and a spring for holding the clamp-jaws closed, substantially as specified.

10. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, a reciprocating slide having a wedge or cam engaging said pin or projection on the crank-arm to lift said pin and crank-arm from the lower to the upper part of said guide or cam, and a spring adapted to engage said pin on said crank-arm at the rear end of its stroke to guard against the pin being returned in the lower member or the stamp to properly moisten the same. Said pin 61 on the lever 57 by engaging the cam 62 on the slide 60 moves said arm or lever up and down, the slot 59 in said slide 60 giving the necessary play or lost motion to enable this up-and-down movement to take place before said slide 60 carries the lever 57 and moistening-pad 55 backward. The stamp-moistening pad 55 is by this means first raised above the level of the stamp on the stamp-support 54, then moved horizontally over the stamp, then moved downward upon the stamp, and then wiped or drawn horizontally over the surface of the stamp.

While the stamp is being operated upon by the moistening-pad it is supported on the stamp-presser plate 54, before mentioned.

162 is a stationary cutter or knife which operates in conjunction with the movable knife or cutter 63 to sever the stamp (which has been fed forward over the presser-plate 54 by the stamp-feeder) from the stamp-ribbon after said stamp has been moistened. The movable knife 63 is secured to the rear edge of the stamp-presser plate and is operated thereby. The upper edge of the movable knife 63 does not project above the surface of the presser-plate 54 sufficiently to cut the envelop when said plate presses the stamp against it.

The stamp-presser plate 54 has an up-and-down movement to press the stamp against the under side of the envelop at the corner thereof, said plate being carried by a reciprocating slide or plunger 64, moving up and down in a suitable guide 65. It is connected by a pivoted link 66 to a lever 67, pivoted to the frame of the machine, which is operated by a slotted reciprocating link 68, pivoted to a crank-arm 69 on the rock-shaft 50. The lever 67 has a pin 70, which fits in the slot 71 in said link 68, said link being also furnished with a notch 72 to engage said pin and cause the stamp-presser plate to be lifted at the proper time, and then permit it to be quickly retracted by the spring 73, connected to its operating-link. The envelop is held in position against the pressure of the stamp-presser plate 54 by a spring-plate 154, secured to the frame above the feed-table 2.

The slide 60, which operates the stamp-moistening-pad arm, is connected by a link 74 with the crank-arm 69, and is thus operated from the same rock-shaft 50 as the stamp-presser plate.

Motion is communicated to the vibrating arm or lever 16, by which the slide or carriage 9 of the longitudinal envelop-feeder is operated from the rock-shaft 50, by an arm 76, which is connected by a link 77 with an arm 78 on a shaft 79, carrying a bevel-gear 80, which meshes with a bevel-gear 81 on the shaft 181, to which said arm or lever 16 is secured.

The transverse envelop-feeder consists, preferably, of a pusher-bar 82, having pins 83 passing through the transverse slots 5 6 in the feed-table and connected with the reciprocating slide 82, that works back and forth in suitable guides 85 on the frame and serves to push the envelop transversely forward off the feed-table and into the bite of the sealing-rolls. The slide or carriage 82 of the transverse envelop-feeder is connected by a pivoted link 86 to the lever 87, pivoted to the frame at 88, and connected by a slotted link 89 with an arm 90 on the rock-shaft 50. The slot in the link 89 gives the necessary lost motion to cause the transverse feeder to move forward at the proper time. A spring 91 retracts said transverse feeder. As the envelop is fed transversely forward by the transverse feeder the mucilaged surface of the flap is drawn over and pressed against the flap-moistening pad or device and properly moistened.

92 92 are sealing-rollers, preferably of rubber and preferably two pair in number. They serve to securely press both the stamp and moistened flap against the envelop and seal the same. Motion is communicated to the lower sealing-roller of the first pair by a pulley 93 on the driving-shaft 94 and a belt 95, which passes over a pulley 96 on the shaft of said roller. Pulleys 97 97 and belt 98 communicate motion to the lower roller of the second pair. Motion is communicated from the driving-shaft 94 to the crank-shaft 53, which operates the actuating-lever 49 of the stamp-feed slide by the intermeshing gears 99 99.

100 100 are guide-rollers over which the stamp-feed belts pass.

The arm 24 of the presser-plate 23 is held normally up by the transverse feeder 82 and is caused to be depressed by its spring 25 against the envelop at the proper time by the forward movement of said transverse feeder.

As the longitudinal envelop-feeder consists of a pair of reciprocating clamping-jaws, which close upon and grasp the envelop placed between them, and as this feeder reciprocates a certain definite distance, it serves to bring the forward end of the envelop into the exact position required to receive the stamp at its upper right-hand corner, whatever may be the length of the envelop. If the envelop is a long one, the clamping-jaws will grasp it near its middle in respect to length; if a very short one, the clamping-jaws will grasp it near its rear end. The longitudinal feeder thus serves to feed the envelop in the direction of its length the required distance to bring its upper right-hand corner into proper registry with the stamp-presser plate, whatever may be the length of the envelop.

I claim—

1. In a machine for sealing and applying postage-stamps to envelops, the combination with a feed-table, of a longitudinally-reciprocating feeder for moving the envelops on the feed-table in the direction of their length, a flap-raising device, a moistening-pad, a presser-plate on the frame to hold the flap against the moistening-pad, a stamp-ribbon feeder, a pad or device for moistening the stamp, a vertically-reciprocating presser-plate for supporting the stamp as it is being moistened and pressing it against the envelop, a pair of knives or cutters for severing the stamp from the stamp-ribbon, a plate or device for holding the envelop in position against the pressure of the stamp-presser plate, a transversely-reciprocating feeder, and sealing-rolls, substantially as specified.

2. In an envelop sealing and stamping machine, the combination with the feed-table provided with a longitudinal slot, of a reciprocating envelop-feeder comprising a pair of opening and closing clamping-jaws working in said slot, and levers and connections for opening and closing the clamping-jaws and reciprocating the same along the feed-table, one of said clamping-jaws being carried above the feed-table and engaging the upper side of the envelop, and the other being carried below the feed-table and clamping the envelop from below, substantially as specified.

3. The combination with a slotted feed-table, of a reciprocating envelop-feeder comprising a pair of opening and closing clamping-jaws working in the slot of the feed-table, a flap-raising device and a flap-moistening device, one of said clamping-jaws being carried above the feed-table and engaging the upper side of the envelop, and the other being carried below the feed-table and clamping the envelop from below, substantially as specified.

4. The combination with a slotted feed-table, of a reciprocating envelop-feeder comprising a pair of opening and closing clamping-jaws working in the slot of the feed-table, a flap-raising device, a flap-moistening device and a movable presser-plate to hold the flap against the moistening device, and means for operating said movable presser-plate, substantially as specified.

5. The combination with a feed-table, of a stamp-ribbon-feed device, comprising a pair of opening and closing jaws and a pair of flexible belts between the jaws and between which the stamp-ribbon passes, substantially as specified.

6. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, substantially as specified.

7. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, said cam or guide being in two parts, one adjustable in respect to the other to enable the extent of feed to be accurately adjusted, substantially as specified.

8. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, a stationary endless guide or cam engaging said pin or projection to control the opening and closing of the clamping-jaws and the extent of feed, and a reciprocating slide having a wedge or cam engaging said pin or projection on the crank-arm to lift said pin and crank-arm from the lower to the upper part of said guide or cam, substantially as specified.

9. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed and a spring for holding the clamp-jaws closed, substantially as specified.

10. The combination with a pair of flexible belts between which the stamp-ribbon passes, of a reciprocating stamp-ribbon feeder, consisting of a pair of pivoted, opening and closing clamping-jaws embracing said belts, a reciprocating carriage upon which said clamping-jaws are mounted, an operating-shaft connected with one of said clamping-jaws having a crank-arm furnished with a pin or projection, and a stationary endless guide or cam engaging said pin or projection to control the opening and closing of the clamping-jaws and the extent of feed, a reciprocating slide having a wedge or cam engaging said pin or projection on the crank-arm to lift said pin and crank-arm from the lower to the upper part of said guide or cam, and a spring adapted to engage said pin on said crank-arm at the rear end of its stroke to guard against the pin being returned in the lower member or part of said stationary cam or guide, substantially as specified.

11. The combination with a feed-table, of a stamp-ribbon-feeding mechanism, of a reciprocating presser-plate for supporting the stamp while it is being moistened and pressing it against the envelop after it is moistened, and an envelop-feeder for moving the envelop along said feed-table into position to receive the stamp, substantially as specified.

12. The combination with a feed-table of a stamp-feed device, a vertically-reciprocating stamp-ribbon-presser plate, a moistening-pad having an up-and-down and reciprocating movement and an envelop-feeder for moving the envelop along said feed-table into position to receive the stamp, substantially as specified.

13. The combination with a feed-table, of a stamp-ribbon-feed device, a reciprocating stamp-presser plate, and a movable stamp-moistening pad operating to moisten the stamp while it is supported on said stamp-presser plate and an envelop-feeder for moving the envelop along said feed-table into position to receive the stamp, and sealing-rollers, substantially as specified.

14. The combination with a feed-table, of a stamp-ribbon-feed device, a reciprocating stamp-presser plate, a pair of knives or cutters for severing the stamp from the stamp-ribbon and an envelop-feeder for moving the envelop along said feed-table into position to receive the stamp, and sealing-rollers, substantially as specified.

15. The combination with a feed-table, of a stamp-ribbon-feed device, a stamp-presser plate, a pair of knives or cutters, and a movable stamp-moistening pad and an envelop-feeder for moving the envelop along said feed-table into position to receive the stamp, and sealing-rollers, substantially as specified.

16. The combination with a feed-table, of a stamp-ribbon-feed device, a stamp-presser plate, a pair of knives or cutters, a movable stamp-moistening pad, and a plate for holding the envelop in position against the thrust of the stamp-presser plate and an envelop-feeder for moving the envelop along said feed-table into position to receive the stamp, and sealing-rollers, substantially as specified.

17. The combination with a feed-table, of a pair of flexible belts between which the stamp-ribbon passes, a pair of reciprocating stamp-feeding jaws embracing said belts and the stamp-ribbon between them, a vertically-reciprocating stamp-presser plate, a stationary knife and a movable knife connected with the stamp-presser plate, substantially as specified.

18. The combination with a feed-table, of a pair of flexible belts between which the stamp-ribbon passes, a pair of reciprocating stamp-feeding jaws embracing said belts and the stamp-ribbon between them, a vertically-reciprocating stamp-presser plate, a stationary knife and a movable knife connected with the stamp-presser plate, and an up-and-down-moving and horizontally-reciprocating stamp-moistening pad, substantially as specified.

19. The combination with a feed-table, of a pair of flexible belts between which the stamp-ribbon passes, a pair of reciprocating stamp-feeding jaws embracing said belts and the stamp-ribbon between them, a vertically-reciprocating stamp-presser plate, a stationary knife, and a movable knife connected with the stamp-presser plate, an up-and-down-moving and horizontally-reciprocating stamp-moistening pad, a pair of revolving sealing-rollers and a transversely-reciprocating envelop-feeder, substantially as specified.

20. The combination with a feed-table, of a longitudinally-reciprocating envelop-feeder, a transversely-reciprocating envelop-feeder, a flap-raising device, a flap-moistening pad or device, and a pair of sealing-rollers, substantially as specified.

21. The combination with a feed-table, of a longitudinally-reciprocating envelop-feeder, a transversely-reciprocating envelop-feeder, a flap-raising device, a flap-moistening pad or device, a pair of sealing-rollers, and a plate or device for pressing or holding the flap against the flap-moistening pad or device, substantially as specified.

22. The combination with a slotted feed-table, of two feeders one for moving the envelop in the direction of its length and the other transversely thereto, said feeder for moving the envelop in the direction of its length, comprising a pair of opening and closing clamping-jaws working in the slot of the feed-table one of said clamping-jaws being carried above the feed-table and engaging the upper side of the envelop and the other being carried below the feed-table and clamping the envelop from below, substantially as specified.

23. The combination with a slotted feed-table, of two feeders one for moving the envelop in the direction of its length and the other transversely thereto, a flap-moistening device and sealing-rollers, said feeder for moving the envelop in the direction of its length, comprising a pair of opening and closing clamping-jaws working in the slot of the feed-table, one of said clamping-jaws being carried above the feed-table and engaging the upper side of the envelop, and the other being carried below the feed-table and clamping the envelop from below, substantially as specified.

24. The combination with a slotted feed-table, of two feeders one for moving the envelop in the direction of its length and the other transversely thereto, a flap-moistening device, sealing-rollers and a plate for holding the flap against the moistening device, said feeder for moving the envelop in the direction of its length, comprising a pair of opening and closing clamping-jaws working in the slot of the feed-table one of said clamping-jaws being carried above the feed-table and engaging the upper side of the envelop and the other being carried below the feed-table and clamping the envelop from below, substantially as specified.

25. The combination with a slotted feed-table, of a longitudinally-reciprocating envelop-feeder consisting of a pair of opening and closing clamping-jaws working in the slot of the feed-table, and a stamp-presser plate into registry with which said feeder serves to bring the upper right-hand corner on the envelop, whatever may be the length of the envelop, and a plate to hold the envelop in position against the pressure of said stamp-presser plate substantially as specified.

26. The combination with a feed-table provided with longitudinal and transverse slots therein, of longitudinally and transversely reciprocating feeders moving along said slots in the feed-table, said longitudinally-reciprocating feeder comprising a pair of opening and closing clamping-jaws, one of said clamping-jaws being carried above the feed-table and engaging the upper side of the envelop, and the other being carried below the feed-table and clamping the envelop from below, substantially as specified.

27. The combination with a stamp-ribbon feed mechanism and a vertically-reciprocating stamp-presser plate, of a stamp-moistening pad having an up-and-down and a horizontally-reciprocating movement, a feed-table having a slot and a longitudinally-reciprocating envelop-feeder comprising a pair of clamping-jaws working in said slot, substantially as specified.

28. The combination with a stamp-ribbon-feeding mechanism and a stationary cutter, of a movable stamp-presser plate furnished with a cutter, a feed-table having a slot and a longitudinally-reciprocating envelop-feeder, comprising a pair of clamping-jaws working in said slot, substantially as specified.

29. The combination with a pair of stamp-feed belts between which the stamp-ribbon passes, of a pair of stamp-feed jaws embracing said belts to move the stamp-feed ribbon forward intermittently the length of a stamp at each movement, substantially as specified.

30. The combination with a pair of stamp-feed belts between which the stamp-ribbon passes, of a pair of stamp-feed jaws embracing said belts to move the stamp-ribbon forward intermittently the length of a stamp at each movement, and means for adjusting or regulating the feed-stroke of said clamping-jaws, substantially as specified.

ALBERT F. ROBERTS.

Witnesses:
H. M. MUNDAY,
EDWARD S. EVARTS.